United States Patent [19]

Dailey

[11] 3,944,362

[45] Mar. 16, 1976

[54] METHOD AND APPARATUS FOR DETERMINING THE TIME INTENSITY INTEGRAL OF THE EXPOSURE OF A NEGATIVE ONTO PHOTOGRAPHIC PAPER

[76] Inventor: John L. Dailey, 119 E. McKinley, Tempe, Ariz. 85281

[22] Filed: Sept. 24, 1974

[21] Appl. No.: 509,018

[52] U.S. Cl. .......................... 355/38; 355/68; 355/1
[51] Int. Cl.² .......................................... G03B 27/78
[58] Field of Search ...................... 355/38, 68, 41, 1

[56] References Cited
UNITED STATES PATENTS

| | | | |
|---|---|---|---|
| 3,708,676 | 2/1973 | Huboi | 355/68 X |
| 3,790,275 | 2/1974 | Huboi | 355/68 |

*Primary Examiner*—Monroe H. Hayes
*Attorney, Agent, or Firm*—Cahill, Sutton & Thomas

[57] ABSTRACT

A method and apparatus is described for determining the time intensity integral of the exposure of a negative in additive primary colors onto photographic paper. A plurality of discrete areas of a negative are scanned and the light transmitted through these areas is directed onto photosensitive devices each appropriately filtered to be responsive to a different one of the primary additive colors. The electric signals derived from the photoelectric device are applied to fulcrum circuits, one for each of the additive colors; the fulcrum circuits each form an analog voltage linearly corresponding in their respective colors to the fraction of the total area of the negative which has a transmissivity greater than the mean transmissivity of the whole. The analog voltages thus derived, one for each of the primary colors, are applied to control circuits that produce electrical signals to terminate the exposure in the corresponding primary color in accordance with the amplitude of the analog voltage. Alternatively, the analog voltage is utilized to derive an indication to instruct the operator of a typical printing machine to make appropriate adjustments to produce desirable color intensity characteristics in the print.

23 Claims, 9 Drawing Figures fig. 1 fig. 2 fig. 3 fig. 6 fig. 4 fig. 7 fig. 5 fig. 8 fig. 9

METHOD AND APPARATUS FOR DETERMINING THE TIME INTENSITY INTEGRAL OF THE EXPOSURE OF A NEGATIVE ONTO PHOTOGRAPHIC PAPER

This invention relates to method and apparatus for determining the amount of red, green and blue light that should be used in exposing a negative onto photographic paper in making a color print.

It is well established in a photographic art to print according to the method designated "integration to gray". In the method of integration to gray, a set of photodetectors covered by red, green and blue filters sample the light transmitted by the negative either prior to or during the exposure step. The control circuits of the printing machine are so disposed that the time-intensity integral will be a constant for each of the three colors. The machines contain adjustment provision which enables a quality control technician to vary the values of the time-intensity integrals to levels he considers optimum and which will then apply to all negatives printed by the machine. There is further adjustment provision enabling the operator to vary the exposure for individual negatives; a set of density correction buttons adjust the integrals for all three colors on a common scale and provide for veriation in the overall density of the print without color change; a set of color correction buttons vary the integrals for the three colors individually and provide for variation in the color of the print without density change.

It is common that machines which print by integration to gray contain further provision for adjustment of the timeintensity integral by means of circuits called "slope circuits". It is known that the three gamma curves of a color film emulsion are not identical and therefore there will be a variation in the average color of the negative versus exposure level in the camera. Slope circuits are intended to introduce a variation with time in the time-intensity integral to compensate this color shift versus exposure level.

The purpose of integration to gray is to correct for a phenomenon called "illumination failure." Let a scene be illuminated by light of a specified color and let it be photographed on color film and the film processed. It is now possible, for a given paper emulsion and specified paper processing, to determine empirically what exposure, in terms of color, intensity and time, should be used to produce an optimum print. If further negatives should be made of this scene under identical conditions of light, film, processing, etc., the exposure previously found may be used in printing all negatives and identical prints will result.

But if the light on the scene should vary toward red, as daylight does in the late afternoon, the processed negative will vary and have an overall color which is cyan relative to the previous negative. If the printing light source remains constant, the cyan negative will reduce the amount of red light striking the paper, and for constant printing times in the three colors, the result will be a print with a reddish overall caste. This is correct in terms of what the camera saw, but it is not what is desired.

Further, the cyan cast of the negative may be caused by elements other than the scene illumination. There are day-to-day variations in film processing which cause variations in the color of the negatives produced. It is not possible to eliminate variation in film manufacturing which results in differences in spectral responses and sensitivities of different batches of film. Whatever the cause, the result for printing purposes is that there has been a shift in the average color of the negative which is causing an undersired shift in the color of the final print.

The method of integration to gray copes with illumination failure by sensing the color shift in the negative and adjusting the appropriate exposure time to compensate for it. Under constant time printing, a cyan shift in the negative, reducing the transmission of red light through the negative, would cause a decrease in the time-intensity integral for the red exposure. As the transmitted red intensity drops, the integrating circuits of the printer increase the time to hold the time-intensity integral constant. Thus, no matter what color shift may occur in the negative, there is no color shift in the exposure at the paper. In the absence of slope circuit adjustment and a variation known as undercorrection, constant exposure in both intensity and color is the objective of the method.

The flaw in integration to gray is that constant printing exposure will not produce uniformly good print quality. The basic method assumes that all variation in the integrated color of the negative is due to illumination failure; that is, it assumes that the color shift it detects in a negative has been caused by a variation in the color of the illuminant on the scene from the desired color or due to film or processing variations, any of which must be corrected for. In fact, however, the variation in the negative might equally be caused by a variation in the scene itself.

If the illumination on the scene remains constant and there is no variation in film or processing, a cyan shift in the integrated color of the negative can still be accomplished by the simple expedient of adding a red object to the scene. The effect of this is called "color subject failure," implying that the subject before the camera fails to meet the prescribed conditions of color distribution which the technique of integration to gray requires.

To cope with subject color failure, it is the practice to introduce into the machine a feature called undercorrection. The light transmitted by the negative and sampled by the phototubes has a specific color which may be plotted on a chromaticity diagram. The time intensity integrals in all three colors, when the machine operates at its target of integration, represents another color which may also be plotted on the diagram. The difference between these two colors represents the vectorial sum of the illumination failure and the subject color failure of the negative. In its simplest form, integration to gray attributes this entire difference to illumination failure and corrects for it totally by integrating the exposure to the target of integration. The technique of undercorrection recognizes that in the average of a large population of negatives, a fixed portion, such as thirty per cent, of these color differences will be attributable to subject color failure. It is obvious that one does not wish the integrating circuits to introduce a correction for subject failure as they do for illumination failure. Illumination failure is an unintended and undesired shift in the color of the negative from an ideal color. Subject failure, however, is caused by a variation of the subject from the average and is therefore an intended and desired color shift in the negative. It is desired that in the case of subject failure, the mean density and color of the print should deviate from the average in the same way that the subject did, and therefore the exposure onto the paper should deviate from the average. But integration to gray is designed to eliminate all such deviation.

Undercorrection is a statistical compromise between full integration, which assumes that all deviation in the negative from a standard is due to illumination failure, and fixed time or white light printing, which assumes that all deviation in the negative is due to subject failure. In one mode, it is accomplished by an electrical cross-coupling of the three integrator circuits; in another it is accomplished by using filters in the exposure termination system which are less perfect than is possible. For example, the magenta filter, which nominally terminates the green exposure, may have a relatively high transmission in the green region of the spectrum, and relatively low transmission in the red and blue regions, relative to what is possible. In either case, the effect is that while the machine is nominally set to integrate to a fixed color, it will be fact integrate to a color which is intermediate between the color of the negative and the target of integration. The fraction of the distance through which the machine moves the exposure from the color of the negative to the color defined by the target of integration is called the correction level. This is adjustable by adjusting the cross-coupling circuits in machines that have them and by adjusting the slope circuit levels in machines that do not.

The final result, integration to gray with slope correction and undercorrection, has shown itself to be a most powerful tool of photographic printing. But it is susceptible to errors which are frequently large. In the case where the mix of subject failure and illumination failure deviate significantly from the machine's ratio, or where they are large, or where they have opposite algebraic signs, the print made by the machine is unacceptable. There is a corresponding effect called "subject density failure" in which not the color, but the brightness distribution, of the scene is adjusted to produce variance in the mean transmission of light through the negative. As simple an entity as a difference between light or dark clothing on persons in the scene can result in distinguishable differences in the overall density of a print made on an integrating machine.

To cope with subject density failure, it is practice to provide at the machine a human operator who is trained in estimating the brightness distribution of the negative and who selects for individual negatives a density correction button during the printing process.

In recent years efforts have been made to improve the performance of integrating printers by providing them with variable undercorrection. A massive deviation in the integrated color of the negative from the color representing the population center of many negatives must necessarily represent an unusually large amount of subject failure, since the physics of the process place bounds upon the probable range of illumination failure. Therefore, the correction level should decrease as color variance in the negative increases. Machines built around this principle have been worked successfully without operators, but still exhibit a significant error rate.

In the end, it is mathematically impossible to eliminate the errors from integration to gray. The technique collects but a single piece of information in each of the three primary colors; the mean transmission of the negative. The variables with which it must cope are two for each color; the illumination failure and the subject failure. Thus, in any mathematical description of the process, one must eventually come to three equations in six unknowns, for which no unique solution is possible. It is for this reason that reliance has been placed on statistical, rather than analytic methods.

It is therefore an object of the present invention to provide a method and apparatus for controlling the exposure of a color negative onto photographic paper.

It is also an object of the present invention to provide a method and apparatus for controlling the exposure of a color negative onto photographic paper such that the time-intensity integral of the exposure light in any additive primary color is proportional to a predetermined parameter of the negative.

It is a further object of the present invention to provide a method and apparatus for sampling the transmissivity of a color negative and for generating analog signals corresponding linearly in each primary color to a predetermined parameter of the negative.

It is still another object of the present invention to provide a method and apparatus for sampling the transmissivity of a color negative and for generating analog signals corresponding linearly in each primary color to a predetermined parameter of the negative and for controlling the exposure of said color negative onto photographic paper in response to said analog signals.

The present invention may be understood with more specificity and clarity with reference to the following figures, in which.

The present invention accomplishes the above objects by measuring the subject failure in the negative as a separate entity. With the subject failure known, the number of unknowns in the integration equations reduce from six to three, and a unique solution is possible. The key to this lies in measuring the parameter called the "image fulcrum," which may be defined as the percentage of the total area of the negative which has a transmissivity greater than the mean transmissivity of the whole area of the negative. It can be shown that the fulcrum of the negative in any of the primary colors is directly proportional to the amount of the subject failure that occurs in the negative for that color.

When mathematically described, the method of the present invention may seem complicated. First, phototubes are used to find the integrated color of the negative. Then the vectorial difference between this color and the color representing the machine's target of integration is found, as plotted on a chromaticity diagram. The three fulcrum voltages are generated and plotted to find the vectorial difference between the fulcrum color and the target of integration. Since the first vector represents the sum of the illumination failure and the subject failure in the negative and the second represents the subject failure alone, their difference may be taken to find the illumination failure, which represents the total correction required in printing the negative.

In actual practice, the method is much simpler. Integrating printers normally operate by using the photocurrent to charge or discharge a capacitor until a given voltage change has been accomplished. to utilize the fulcrum voltage in printing, all that is necessary is that the voltage change brought about by the photocurrent should be proportional to the fulcrum voltage.

The apparatus of the present invention includes three basic sections: the scanner, the fulcrum circuit, and the control circuit, or alternatively, a display system to make information available for later use. The scanner may be any sort of image dissector which has a linear output or an output which may be made linear by the addition of gamma corrector circuits. Electro-optic systems, such as flying spot scanners or vidicon tubes may be used, but these have been tested in this application and it is found that their size, cost and electronic complexity make them devices of last resort. Mechanical devices are to be preferred. Their relatively low resolution is not a disadvantage here; mathematical analysis indicates that as few as fifty sampling points could be successful and that more than two hundred and twenty sampling points would offer no useful improvement in accuracy.

Figure 1:
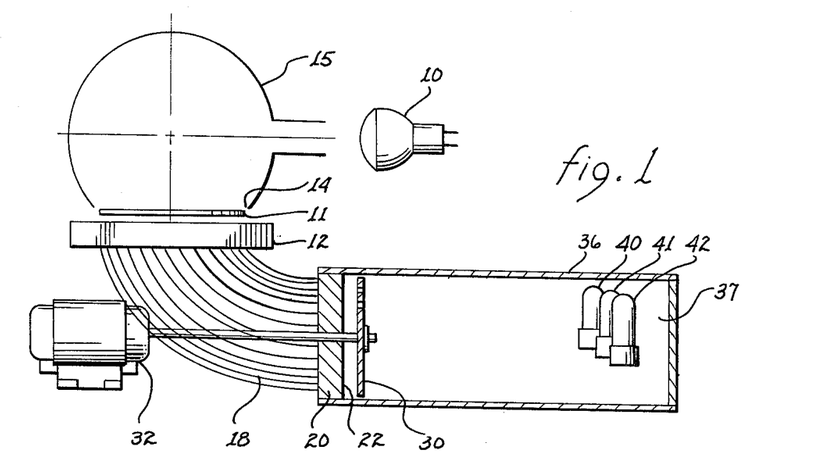
FIG. 1 is a schematic illustration of mechanical scanning apparatus useful in practicing the method of the present invention and forming a part of the apparatus of the present invention.
Figure 2:
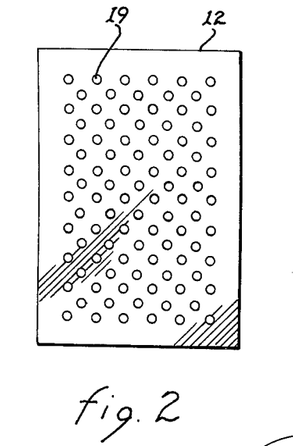
FIG. 2 is a front elevational view of the raster plate of FIG. 1.

A preferred embodiment, comprising a raster to circle fiber-optics arrangement, is shown in FIG. 1. A light souce 10, which might be the light source of the printer itself, illuminates the negative 11, positioned at the gate 14 of a diffuser 15. For reasons of accuracy, this light source should have its filament operated by a direct current or else be a rather high current source with large thermal inertia which will prevent oscillation of the light intensity at the line frequency. Immediately below the negative is the raster plate, marked 12. The surface of plate 12 is shown in FIG. 2, and has embedded within it an array of optical fibers 18 with their ends 19 exposed at the surface so that light transmitted through the negative may enter the fibers. A method of making the plate is simply to drill holes, either in an X-Y array or in hexagonal close packing, and to insert the optical fibers into the holes, fixing them with an index matching cement and subsequently polishing the surface. An alternative method of forming the plate 12 is to prepare a jig in the form of a three sided open box with width corresponding to one dimension of the negative to be scanned. The ends of the fibers are dipped in cement and laid in the open box. The fourth side is then forced into position under pressure, extruding the excess cement and packing the fibers closely. When the cement has hardened, the surface is ground and polished.

Figure 3:
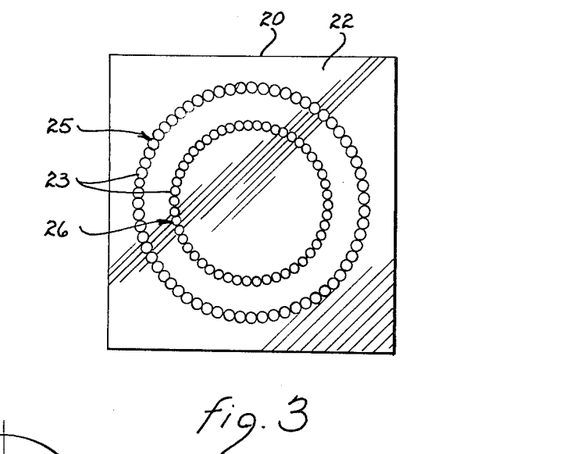
FIG. 3 is a front elevational view of a plate of FIG. 1.

The fibers 18 from the raster plate 12 run directly to the plate 20 shown in FIG. 1, which may be referred to as the circle plate. The surface of plate 20 is shown in FIG. 3. The ends of the fibers 18 are arrayed in a circle in plate 20. As in the case of the raster plate 12, a method of fabrication of the plate 20 is to drill an array of holes, insert the fibers and fix them in place with an index matching cement. An alternative is to mill a circular groove in the plate, with the width matching the diameter of the fibers when compressed, and to then coat the ends of the fibers with cement and force them into the groove in a tightly packed array. The face 22 of the plate may then be milled to uncover the fiber ends. Grinding and polishing will finish the plate.

FIG. 3 shows an array of fiber ends 23 formed by arranging the ends in concentric circles 25 and 26. In the simplest form of the device there may be only one circle in the array; however, if phototube printing is to follow the scanning step, it is necessary that the area of the negative that is scanned for metrication purposes be identical to the area seen by the phototubes. There are many sizes of negatives in common use and if one is to print them all, one must have raster plates to match. It is possible to connect several raster plates to a single circle plate, which will obviate having to duplicate the entire system if several sizes of negatives are to be printed. Plates not in use may be covered by an opaque material so that no light from them can reach the photodetectors, thereby effectively eliminating the unused plates from the system.

The circle plate 20 is faced by a spinning disc 30, driven by a suitable electric motor 32. The speed at which the disc 30 spins will determine the time required for examination of the negative. A motor speed of several thousand revolutions per minute is desirable if a high print production rate is to be achieved. A hole 34 is provided in the disc directly opposite the circular array 25 of fibers; as the disc spins the hole sequentially uncovers the fibers. When multiple raster plates are connected to a single circular plate, or when there are additional circular arrays such as array 26, there will obviously have to be a hole for each circle. Care should be taken that the holes are so distributed that the disc is in mechanical balance while spinning. The smallest diameter hole that will give adequate signal from the phototubes should be used. The distance between fibers and spinning disc should be minimized to improve signal level and resolution. Thick discs with conical holes are to be preferred to thin discs, as experience has shown that thin discs flex while coming up to speed, touch the plate and go into oscillations that damage materials.

The circle plate 20 forms one end of an oblong box 36 which is light tight and which contains at its far end 37, opposite the spinning disc 30, an array of three multiplier phototubes 40, 41 and 42, which might conveniently be type 931A, and which are covered by a set of three color separation filters (not shown), such as Wratten filters Nos. 92, 93 and 94 or an equivalent set of red, green and blue filters.

The phototubes 40–42 sense the light transmitted through the aperture 34 in the spinning disc 30 and generate output signals used by the analyzer circuits. Because of the inverse square law, the signals will oscillate sinusoidally as the disc 30 spins with blank film in the gate 14. This can be minimized by making the box 36 long relative to the diameter of the array circle and by using reflective walls in the inside of the box. A diffusing screen (not shown) may be placed midway between the spinning disc and the phototubes to reduce it further.

Figure 4:
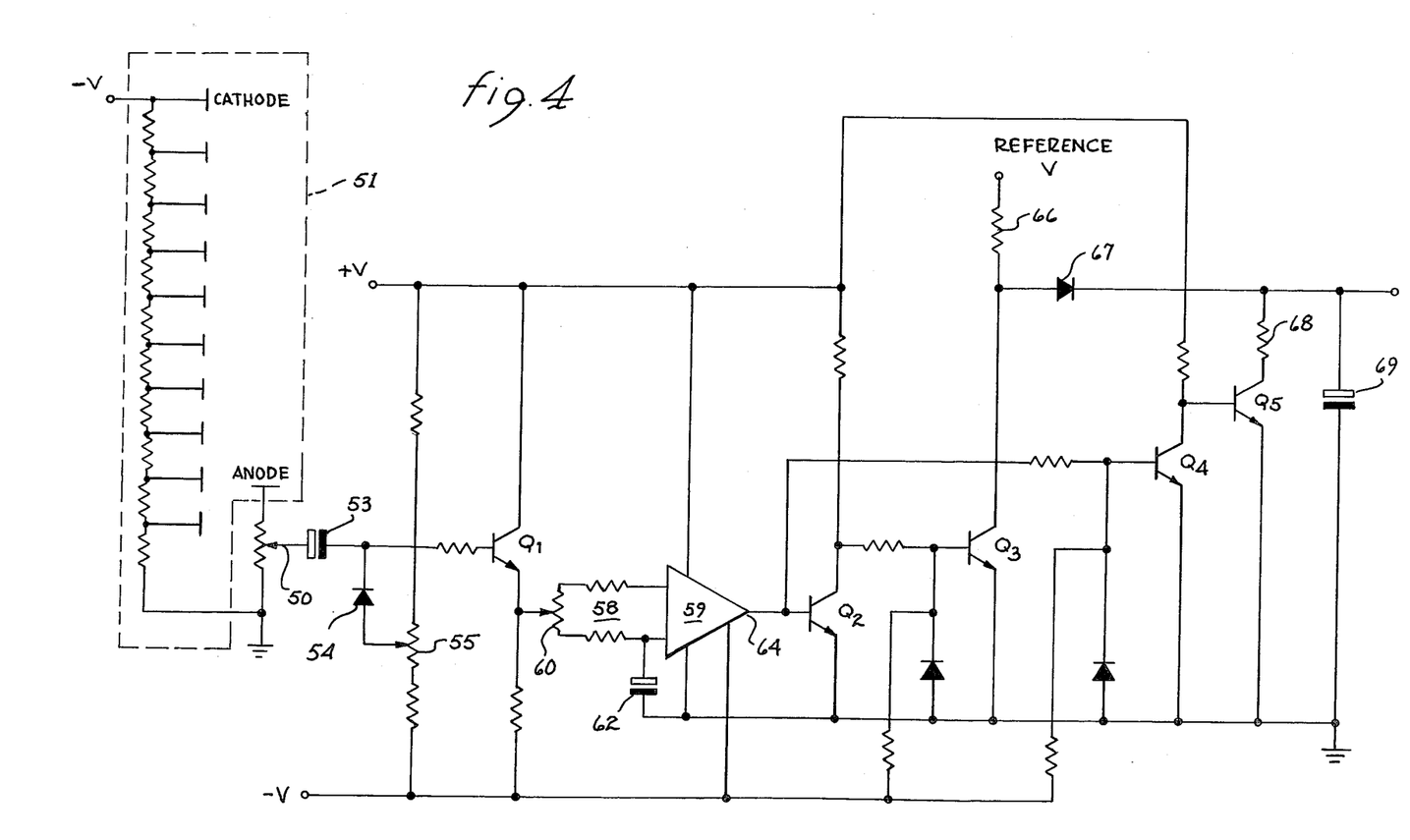
FIG. 4 is a schematic circuit diagram illustrating a circuit for developing an analog voltage useful in practicing the present invention.

Three fulcrum generating circuits are provided to receive the output signals from the three phototubes 40–42 and produce from them analog voltages to be used by control circuits. A representative fulcrum generating circuit is shown in FIG. 4. The circuit operates by dividing the output signal from one of the phototubes 40–42 into two channels of approximately equal amplitude, then integrating one on a capacitor to obtain a voltage proportional to the mean transmission of the negative. This voltage is presented to one gate of a voltage comparator circuit and the time varying signal from the other channel is presented to the other gate. The voltage comparator is of the type that saturates when the voltage on one gate is higher than the voltage on the other gate and which is at cut-off when the reverse it true. Therefore, the output is at binary digital "one" when the scanner is examining a point on the negative which has a transmission higher than the mean; it is at binary digital "zero" when the scanner is examining a point on the negative which has a transmission lower than the mean.

The output of the voltage comparator is therefore a train of square wave pulses of constant amplitude with a duty cycle which is proportional to the fraction of the total area of the negative which has a transmission higher than the mean. The wave train is integrated on another capacitor to obtain an analog voltage proportional to the duty cycle, and this is the fulcrum voltage.

The function of the circuit of FIG. 4 can be seen to match the difinition of the image fulcrum for the negative, which is that the fulcrum of a negative is the percentile fraction of the entire area of the negative which has a transmittance greater than the integrater or mean transmittance of that same entire area. The normal range of the fulcrum has been found experimentally to be from 0.35 to 0.65, although instances of negatives falling outside this range can and do occur. The extreme example found was that of an outdoor flash photo taken at night, which showed values of 0.91, 0.92 and 0.92 and which was printable.

To consider the circuit of FIG. 4 in more detail, the potentiometer 50 serves as the anode resistor in the phototube circuit 51 and is adjusted to provide a voltage swing of approximately 5 volts at the emitter Q1. Because the signal from the phototube 51 is negative and negative going, and the following circuit is NPN, the signal is a.c. coupled through capacitor 53 and its DC level is set by diode 54 and an adjustment of potentiometer 55 such that the signal at the emitter of Q1 remains above ground when there is blank film in the scanner. The signal is divided in the resistor network 58 feeding the comparator 59, for which an MC1710C is used.

The emitter of Q1 makes provision for dividing the signal other than exactly equally. When the aperture in the rotating disc crosses the boundary between fibers, light output is interrupted, which chops the signal. Because of this mechanically impressed modulation of the phototube signal, the integrated value will be significantly less than the peak value generated by a piece of blank film in the scanner. Potentiometer 60 is adjusted to raise the voltage on the integrating capacitor 62 to match the peak signal level for blank film. This is accomplished by setting 60 so that the output of the comparator 59 remains continously low, then changing the setting of 60 slowly to find the exact point at which output pulses appear at the output 64 of the comparator 59.

Because of the negative going character of the phototube signal, the instantaneous voltage at the comparator will be lower than the mean voltage on the capacitor 62 when the light intensity on the tube is higher than the mean. Therefore, the comparator 59 is wired such that the output is high when the instantaneous voltage is lower than the mean. This gives the desired result that the comparator output at 64 is high when a higher than average transmittance portion of the negative is being scanned.

The remainder of the circuit of FIG. 4 integrates the comparator output to generate the fulcrum voltage. When the output of 64 of the comparator 59 is high, it switches Q2 and Q4 into conduction, and since Q3 and Q5 are collector coupled to these, they are switched off. When the output at 64 goes low, all four transistors change state. The precision resistor 66 is connected to a carefully regulated reference voltage. When the output of the comparator 59 is high and Q3 is switched off, current flows through resistor 66 and 67 and charges the capacitor 69. At this time, the connection from 69 to ground is interrupted by Q5 being switched off.

When the comparator output at 64 goes low and the four transistors change stage, the current from the source through 66 and 67 is interrupted. Because of the presence of diode 67, the capacitor cannot discharge through Q3; it discharges through resistor 68 and Q5. The alternate charging and discharging of capacitor 69 will continue until an equilibrium state is reached, where the charge and discharge currents are equal. If the percentage of time that charging current flows is $p$ and the reference voltage is $v$ and the voltage on capacitor 69 in the equilibrium state is $v$, then by setting the standard expressions for capacitor charge and discharge equal to one another;

$$\frac{V-v}{RA} p = \frac{v}{RB}(1-p) \qquad (1)$$

where $RA$ is the resistance 66 and $RB$ is the resistance 68, $$v = pV \frac{RB}{RA + p(RB - RA)} \qquad (2)$$

from which
but if $RA = RB$, $$v = pV \qquad (3)$$

from which the final voltage on capacitor 69 is linearly proportional to the fraction of time for which the output of the comparator is high. By the nature of the device, $p$ is also the fraction of time that the scanner examines fractions of the negative having a transmission higher than the mean, and therefore $p$ is also identical to the fulcrum.

The circuit of FIG. 4 is free-running; it need not be switched on and off. However, one must make allowance for time lag between the placing of the negative in the gate and the final settling to equilibrium of the voltage on capacitor 69. There are two separate integration times involved, and they are sequential. First, the phototube signal must be integrated on capacitor 62 to provide the mean level. Until this voltage settles, the duty cycle of the output pulses from the comparator will contain a false value for the fulcrum. After capacitor 62 reaches its final state and correct data begins to flow from output 64 of the comparator 59, integration on capacitor 69 begins. Obviously there will be some overlapping of these times, since the voltage on 69 will tend to track that on 62. It is possible to arrange the scanner to minimize integration time. If the fibers in the circle tend to preserve the arrangement of those in the raster plate, integration time will be long. It would be possible to scan along straight lines in the negative, but this would tend to cause long runs in the phototube signal of nearly constant amplitude. This will cause the Fourier spectrum of the signal to be high in low frequency components with a correspondingly high integration time required.

A deliberate scrambling of the fiber arrangement between raster plate and circle plate will prevent this. Fibers which are adjacent in the circle plate should be separated as much as can be arranged in the raster plate. This will cause a maximum of transitions between high and low light levels at the disc aperture. The Fourier spectrum of the electrical signal will be enriched in high frequency components at the expense of the low frequency components and the integration time will be shortened.

With the fulcrum measured and made available as an analog voltage, it may then be used to control the actual printing operation. There are a number of ways of accomplishing such control, possibly the simplest is that shown in FIG. 5 which shows a discharge type timing capacitor circuit generally familiar to industry. It is common practice to charge a capacitor to a predetermined voltage, then to discharge it by a phototube which senses the light transmission of the negative and to use the time required for discharge as the printing time. However, in the circuit of FIG. 5, the voltage to which the timing capacitor is charged prior to exposure is the fulcrum voltage.

Figure 5:
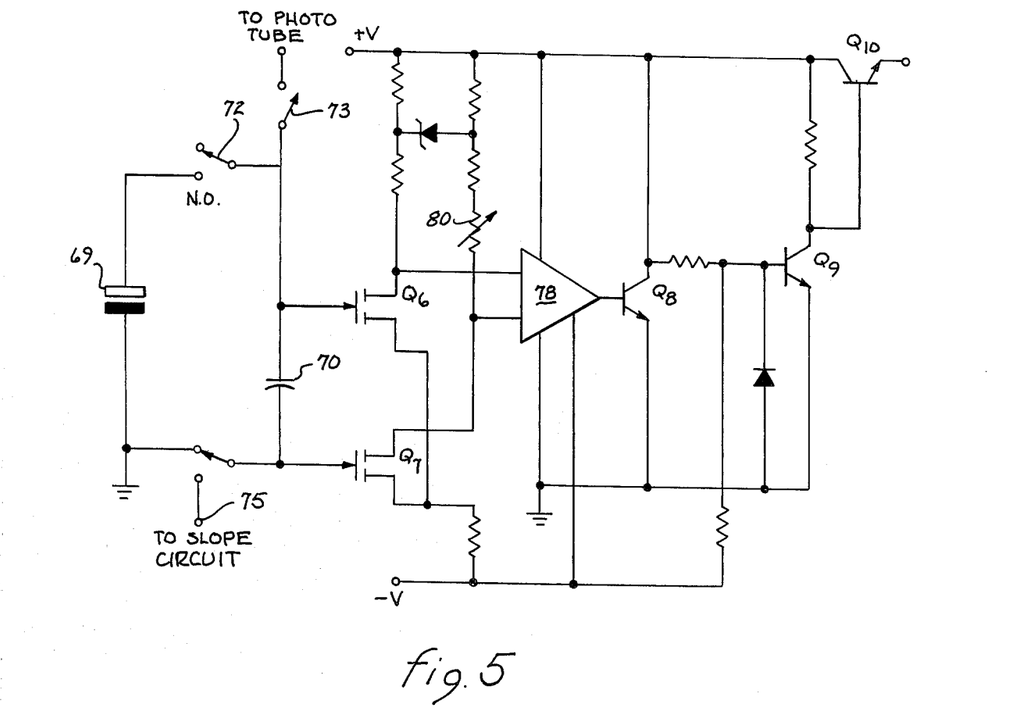
FIG. 5 is a schematic circuit diagram illustrating a typical control circuit useful in practicing the present invention.

For convenience, the capacitor 69 of FIG. 4 has been shown to the left in FIG. 5. During the scanning period, and until the total required integration time has elapsed and the voltage on 69 has come to equilibrium, the timing capacitor 70 is directly connected in parallel with the capacitor 69. This in effect makes 70 a part of 69 and the voltage across 70 when scanning is completed will be the fulcrum voltage. This connection between the capacitors is through the switch 72, the normally open contacts of which are held closed during the scanning period.

Scanning may most conveniently occur while the negative is in the exposure gate of the printer. In this case, the raster plate may be mounted on a slide and moved in to cover the negative. Switch 72 may then conveniently be a pair of pushbutton type switches which are actuated by the raster plate reaching its register position over the gate. Once the necessary integration time has occurred, the rater plate may be withdrawn to permit exposure; the plate's first motion will release switch 72 and disconnect the timing capacitor from the fulcrum integrating capacitor. Since capacitor 70 is then connected at one end to nothing except the gate of a MOSFET (metal on silicon field effect transistor) Q6, it will hold its charge for a very long time.

It is customary to provide automatic printing machines with capping shutters. The electrical signal which opens the shutter to begin the exposure also closes the switch 73, so that simultaneously with the commencement of exposure, current from the phototube begins to discharge capacitor 70. If the terminal 75 in FIG. 5 is connected to a slope circuit, the switch that initiates slope action should close simultaneously with switch 73. Since slope circuits are old in the art and their function is well understood, they will not be discussed here. If no slope circuit is provided, terminal 75 should be connected to ground, in which case a part of switch 72 may be deleted. The use of a slope circuit is to be preferred.

The two MOSFETs Q6 and Q7 are connected as a differential amplifier. When their drain voltages are equal, a Schmitt trigger 78 (which may be a standard circuit such as MC1710C) switches its output. The potentiometer 80 is the firing point adjustment. The gates of the MOSFETs Q6 and Q7 are shorted together and the potentiometer 80 is adjusted to a point where the output of the Schmitt trigger 78 is low, then is adjusted slowly to exactly the point where the output gate of the Schmitt trigger 78 goes high.

When the phototube connected to the circuit of FIG. 5 has completely discharged the timing capacitor 70, the trigger 78 switches and causes Q8 to conduct, which turns off Q9. This causes Q10, a power transistor, to conduct and provides current to operate a solenoid which pulls a filter paddle into the light beam to terminate the exposure in the color corresponding to the particular timing capacitor. Provision should be made for causing the capping shutter to close simultaneously with the third filter paddle, for initiating paper advance, etc., but such features are old and well known to those skilled in the art and need not be described here.

When using the apparatus of the present invention, there must be some provision for calibrating the equipment to a specific paper emulsion, light source, etc.. This is most easily accomplished by making provision for adjusting the reference voltages which supply current to the fulcrum capacitor on an individual basis for each color. A further provision for adjusting all three on a common scale by a single control shaft will simplify density adjustments.

The operation of the circuit of FIG. 5 may be explained mathematically by the discharge equation of the timing capacitor 70. When a capacitor is charged to some initial voltage $V_o$ and is then discharged by a constant current device, of which a photodiode under constant illumination is an example, the equation for the voltage remaining on the capacitor is $$V = V_o - kit \qquad (4)$$

where $k$ is a calibration constant $i$ is the photocurrent and $t$ is time.

Since the photocurrent is the light source intensity times the mean transmissivity of the negative and since the initial voltage is the fulcrum of the negative, equation 4 may be rewritten $$V = p - kit\overline{T} \qquad (5)$$

But the point at which the trigger operates is $V = 0$, and therefore, at the firing point, $$p - kIt\overline{T} = 0 \qquad (6)$$

from which $$kIt = \frac{P}{\overline{T}} \qquad (7)$$

or, in words, the time-intensity integral is directly proportional to the ratio of the fulcrum to the mean transmissivity, which is the condition required for correct density and color, when it occurs equally for all three colors.

Figure 6:
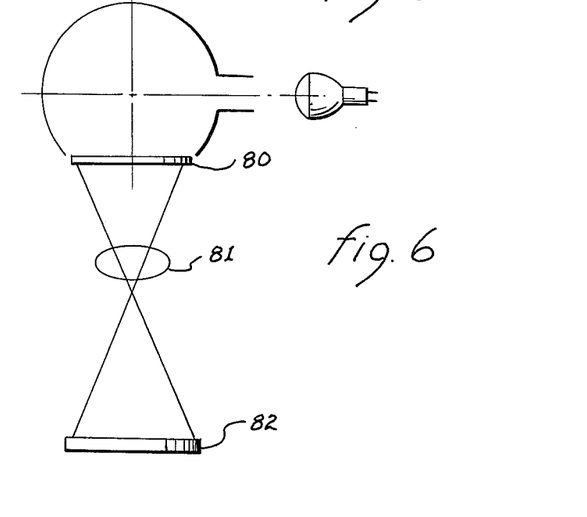
FIG. 6 is a schematic diagram of an enlarger useful in explaining the present invention.
Figure 7:
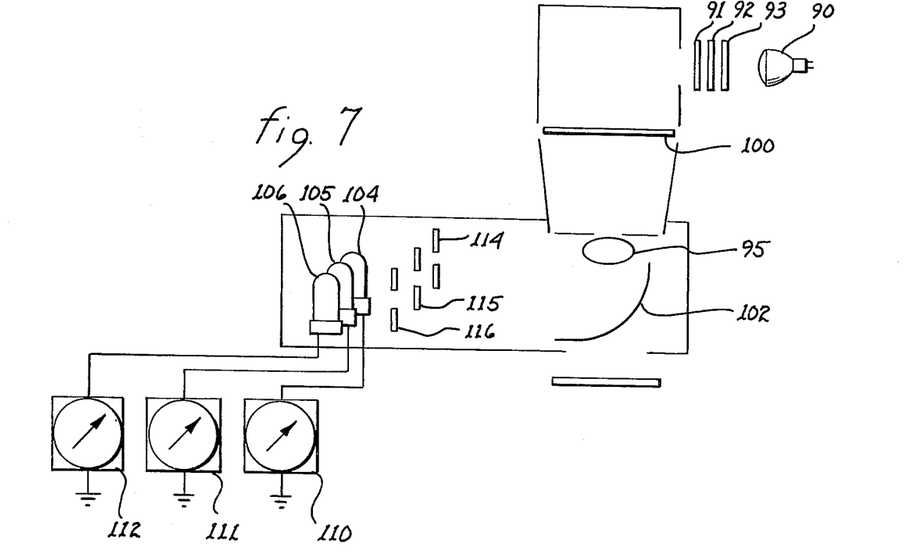
FIG. 7 is a schematic diagram of a modified enlarger useful in describing the present invention.

An alternate technique for implementing the method of the present invention is shown in FIGS. 6 and 7. FIG.

6 shows the optical arrangement for an off-line pre-reader. One could use the same arrangement as in FIG. 1 for a pre-reader, with the negative placed directly over the raster plate, but this requires a raster plate for each cropping size, of which there can be many. In FIG. 6, the negative 80 is projected by a lens 81 onto the raster plate 82. Since the only aspect ratios in common use for prints are 0.71 and 0.80, if there is provision for adjusting the conjugate distances, the use of a lens will make two raster plates suffice for all cropping sizes. In fact, if one is willing to perform additional cropping at the paper mask during printing, when a lens is used, a single raster plate will serve for all size negatives.

The precaution should be taken of using a long focal length lens to minimize the effect of the cosine fourth law on the fulcrum measurements. Further, careful attention should be given to providing uniform illumination at the negative plane. The step of measuring the fulcrum in each of the three colors is exactly the same as in the previous case. But instead of being transferred to another circuit, the fulcrum voltage may be read out by connecting a voltmeter (not shown) to the fulcrum integrating capacitor 69 (FIG. 4). The calibrating of the meter is accomplished by shorting the inputs to the voltage comparator in the fulcrum circuit of FIG. 4 to ground, one at a time. The meter reading with a comparator input which has the capacitor on it at ground is the value $p = 1$, and grounding the other input gives the reading for $p = 0$. The fulcrum is linear between these two points. The value $p = 0$ should yield zero volts, and the value for $p = 1$ may be set at any value of voltage by adjusting the reference voltage of FIG. 4.

FIG. 7 shows an attachment for an enlarger which will enable it to use the data produced by the pre-reader. The light source 90 with adjustable dichroic filters 91, 92 and 93, lens 95 with adjustable diaphragm and paper plane are existing parts of a standard enlarger. To this arrangement is added a light tight box 98 which fits over the lens 95 and which has an aperture 99 opposite the lens to permit the light from the negative 100 to reach the paper 101. A sliding curved metal plate 102 with a white diffusing surface on the side toward the lens is so arranged that the operator can withdraw it to uncover the aperture and expose the paper or slide it under the lens to cover the aperture and deflect the light transmitted by the lens toward a set of three phototubes 104, 105 and 106 covered by color separation filters of red, green and blue (not shown). A set of three current meters 110, 111 and 112 monitor the photocurrent from the tubes. The meters are marked off on a scale from zero to one.

The operator adjusts the f-stop diaphragm of the lens and the dichroic filters until the meter readings are identical to the values for the fulcra found by the pre-reader. He then uncovers the aperture and makes an exposure for a fixed time.

The calibration of the device is accomplished by using a test negative, which is printed by trial and error until a satisfactory print is obtained. The negative is read on the pre-reader. Then, using the time, aperture at lens and filter settings that produced the good print, the adjustable diaphragms 114, 115 and 116 over the three phototubes are set so that the meters indicate the previously recorded fulcra.

It is a convenience to provide a current divider network and to provide a rotary switch so that the meters may be switched from one leg of the current divider to another. One switch position may refer to a one second exposure, another to a five second exposure, another to a ten second exposure, etc.. This prevents having to choose between excluding dense negatives from the system on the one hand or using a very long exposure time for all negatives on the other. It offers the further advantage that if separate calibrations are made for the separate times using a set of negatives of increasing density, there will automatically be correction for the "cross-over effect" in the varying exposures. Since no slope circuits are provided here, such correction will offer significant improvement in overall quality.

The logic behind the technique of FIG. 7 may be seen by referring again to equation 7, which states that the product of the light source intensity and the printing time in any color is linearly proportional to the ratio of the fulcrum to the mean transmissivity of the negative in that color. Equation 7 may be rewritten $$kI\overline{T}t = p \qquad (8)$$

and one may further note that the current from the phototube is proportional to the product of source intensity times the mean transmissivity of the negative, so that, where $i$ is the photocurrent.

$$kit = p \qquad (9)$$

is a condition that exists when the enlarger is set up to make a properly exposed print. Since $t$ is fixed, one need only adjust $i$ according to the value of $p$ by adjusting the $f$-stop and filtration setting to put the enlarger into adjustment for making a proper exposure of the paper.

Another technique that can be used for implementing the method of the present invention involves using a prereader to find the density and color correction buttons to be used in printing a negative on an existing integrating printer. As mentioned previously, such machines are usually equipped with sets of latching buttons which may be pressed by the operator to change the target of integration for individual negatives. It may be shown that the three fulcra define a color which may be plotted on a chromaticity diagram and which represents the optimum determinable target of integration for the printing exposure. Therefore, if the fulcra are properly interpreted, they may be used to select the buttons on the machine which in turn select the target of integration for the exposure.

Figure 8:
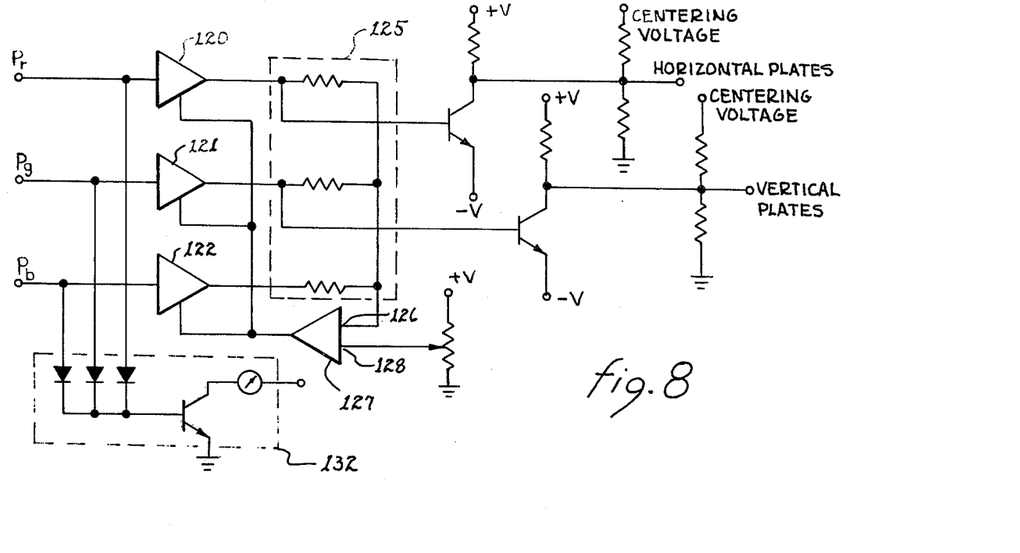
FIG. 8 is a circuit diagram of a typical circuit for use in developing color intensity correction.
Figure 9:
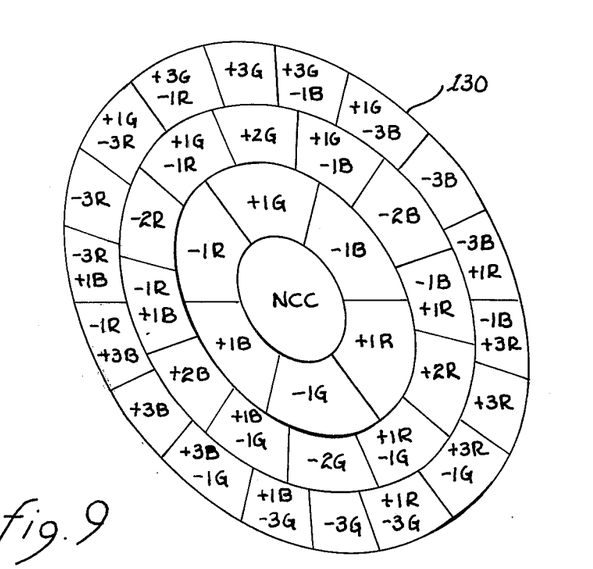
FIG. 9 is a diagram of a mask for use in combination with a cathode ray tube and useful in describing the operation of the circuit of FIG. 8.

Referring now to FIGS. 8 and 9, the three fulcrum voltages $p_r$, $p_g$ and $p_b$ are sampled from their integrating capacitors by three gain controlled amplifiers, 120, 121 and 122, respectively. The outputs of the three amplifiers are added together in a resistance network 125 and their sum is presented to one input 126 of a differential amplifier 127, which has its other input 128 connected to a reference voltage. The output of the differential amplifier provides an error signal to the gain controls of the three gain controlled amplifiers 120–122, adjusting these gains until the sum of the three fulcra is set to some fixed level relative to the reference voltage.

This has the effect of normalizing the fulcra on a scale set by the reference voltage. It may be shown that the color of the desired target of integration is $$X = \frac{p_r}{p_r + p_g + p_b}, \quad Y = \frac{p_g}{p_r + p_g + p_b} \qquad (10)$$

where $X$ and $Y$ are the coordinates on a standard CIE chromaticity diagram. In the case where the sum of the three fulcra is normalized to unity, then, on the scale involved, $$X = p_r, Y = p_g \tag{11}$$

which enables the outputs of the red and green gain controlled amplifiers to determine by themselves the color of the desired target of integration. These two voltages are therefore passed through a high voltage amplifier and, after biasing for centering purposes, are used as the deflection voltage of an electrostatically deflected cathode ray tube.

A common type low voltage oscilloscope tube with a round face plate, such as a 5DEP1, is suitable for use as the cathode ray tube. The face plate of this tube is covered by an overlay 130, such as in FIG. 9. This represents a section of a chromaticity diagram centered on the nominal target of integration of the printer, that is, on the "gray" of "integration to gray." The centering controls of the deflection amplifier are so set that at $p_r = p_g = p_b$, at which condition $X = 0.33$, $Y = 0.33$, the beam of the CRT is undeflected and the spot on the screen is centered in the overlay. Negatives with amounts of subject failure known from test printing may then be used to set the gain controls of the deflection amplifiers empirically. The markings on the overlay represent the color correction buttons on the printer. The operator notes the button indicated by the position of the spot on the screen and this is the button used in printing the negative.

The proper density correction button is found by adding the three fulcrum voltages from the fulcrum integrating capacitors and sensing the sum with the meter circuit 132. The meter is calibrated by using negatives of known printing characteristics and marking the dial face with density button identifications. In operation, the meter readings, in terms of printer buttons, is noted along with the color correction button for use in subsequent printing.

The method and apparatus of the present invention are, of course, not a perfect solution to color printing problems. There exist inevitable errors when using any electrical device while the theory underlying the method incorporates assumptions which in themselves are imperfect. The first assumption is that the negative is sampled at an infinite number of points. The limitation number of points that may be sampled in a given system gives rise to an error, the magnitude of which is at the discretion of the designer; however, even in simple systems, this error can readily be reduced below one percent, which would correspond to 0.004 density filter.

Another assumption is that the density scale of the negative is very long; error increases as the density scale shortens. For a black and white negative, the error would reach a 0.05 density filter as the density scale drops below 1.0 density unit. For purposes of color correction, however, it is the difference between the density scales in the three layers that is significant, and there must be a difference on one full unit to cause a color error of a 0.05 filter. The black and white negative just referred to is too flat to print on an automatic machine using long roll paper. Where the color negative is concerned, the physics of the photographic process makes it highly improbable that the color error from this source would ever rise above that of a 0.005 density filter.

The method and apparatus of the present invention effectively permits the elimination of the effects of subject failure as it commonly occurs in printing by integration to gray. Since it may be desirable under certain circumstances that at least some of the effect of subject failure be permitted to occur in the print, the apparatus may be modified to permit a limited amount of such subject failure occurrence in the print. Such residual subject failure may be permitted in the print by introducing undercorrection into the system by interconnecting the three fulcrum integrating capacitors through a set of resistors so that a matrixing effect occurs.

I claim:

1. The method of forming a color print from a color negative by controlling the time intensity integral of the exposure comprising the steps of:
   a. scanning said negative by directing light therethrough at a plurality of discrete areas;
   b. detecting the light transmitted through said discrete areas of said negative in each of the colors red, green and blue;
   c. determining for each of said colors the fraction of the total area of the negative to be printed which has a transmissivity on a linear scale greater than the mean transmissivity of the same area; and
   d. setting the time intensity integral of the exposure in each of said colors proportional to the fraction of area having a transmissivity greater than the mean transmissivity for that color.

2. The method of forming a color print from a color negative by controlling the time intensity integral of the exposure comprising the steps of:
   a. scanning said negative by transmitting light sequentially through predetermined sampling areas of said negative;
   b. detecting the light transmitted through said negative in each of the colors, red, green and blue;
   c. generating an electric signal for each of the primary additive colors, linearly proportional to the fraction of the total area of the negative having a transmissivity greater than the mean transmissivity of the area; and
   d. setting the time intensity integral of the exposure in each of said colors proportional to the electric signal generated for that color.

3. The method of forming a color print from a color negative by controlling the time intensity integral of the exposure comprising the steps of:
   a. scanning said negative by transmitting light sequentially through predetermined sampling areas of said negative;
   b. detecting the light transmitted through said negative in each of the colors, red, green and blue;
   c. generating an electric analog voltage for each of the primary additive colors, linearly rotational to the fraction of the total area of the negative having a transmissivity greater than the mean transmissivity of the area; and
   d. setting the time intensity integral of the exposure in each of said colors proportional to the electric analog voltage generated for that color.

4. The method of forming a color print from a color negative by controlling the time intensity integral of the exposure comprising the steps of:

a. scanning said negative by transmitting light sequentially through predetermined sampling area of said negative;

d. detecting the light transmitted through said predetermined sampling areas of said negative in each of the primary additive colors, red, green and blue;

c. generating a group of three analog voltages each corresponding linearly to a different one of said primary additive colors, each voltage proportional to the percentage of the total area of the negative having a transmissivity greater than the mean transmissivity of the whole area of the negative in that color; and d. controlling the exposure of said color negative onto said color print by setting the time intensity integral of the exposure in each of said colors proportional to the electric analog voltage generated for that color.

5. Apparatus for determining the time intensity integral of the exposure of a negative onto photographic paper comprising: a light source; means directing light from said light source through said negative through a plurality of predetermined discrete areas in said negative; a plurality of photodetecting means, each responsive to a different primary additive color, and each positioned to receive the light transmitted through said negative for generating electric signals linearly proportional to the intensity of light incident thereupon; a plurality of electric circuit means, each connected to a different one of said photodetecting means, and each responsive to the electric signals generated by a photodetecting means connected thereto for generating an analog voltage proportional to the fraction of the total number of said discrete areas having light transmission higher than the mean light transmission of all of said areas; and timing means connected to said electric circuit means responsive to the amplitude of each of said analog voltages for terminating the exposures of said negative in the color corresponding to each of said analog voltages in accordance with said amplitude.

6. Apparatus for determining the time intensity integral of the exposure of a negative onto photographic paper comprising: a light source; means directing light from said light source through said negative through a plurality of predetermined discrete areas in said negative; a plurality of photodetecting means, each responsive to a different primary additive color, and each positioned to receive the light transmitted through said negative for generating electric signals linearly proportional to the intensity of light incident thereupon; a plurality of electric circuit means, each connected to a different one of said photodetecting means, and each responsive to the electric signals generated by a photodetecting means connected thereto for generating an analog voltage proportional to the fraction of the total number of said discrete areas having light transmission higher than the mean light transmission of all of said areas; and means connected to said electric circuit responsive to the amplitude of each of said amplitude voltages for presenting an indication of the amplitude of each of said analog voltages.

7. The combination set forth in claim 5 wherein said plurality of electric circuit means comprises a plurality of circuits each connected to a different one of said photodetecting means, each circuit responsive to electric signals received from the photodetecting means connected thereto for integrating said signals to obtain a voltage proportional to the mean light transmission of the corresponding negative, a voltage comparator connected to receive said proportional voltage and said electric signals and to generate an output signal when said electric signals have a greater voltage than said proportional voltage, means connected to said comparator for integrating said signals to thereby provide an analog voltage proportional to the fraction of the total of said areas of the negative which have a light transmission greater than the mean light transmission of all of said areas.

8. The combination set forth in claim 6 wherein said plurality of electric circuit means comprises a plurality of circuits each connected to a different one of said photodetecting means, each circuit responsive to electric signals received from the photodetecting means connected thereto for integrating said signals to obtain a voltage proportional to the mean light transmission of the corresponding negative, a voltage comparator connected to receive said proportional voltage and said electric signals and to generate an output signal when said electric signals have a greater voltage than said proportional voltage, means connected to said comparator for integrating said signals to thereby provide an analog voltage proportional to the fraction of the total of said areas of the negative which have a light transmission greater than the mean light transmission of all of said areas.

9. The combination set forth in claim 5 wherein said means responsive to each of said analog voltages includes a capacitor to be charged to said analog voltage, a phototube responsive to one of said primary additive colors, means connecting said capacitor to said phototube for discharging said capacitor through said phototube as light from said light source impinges thereon, and means responsive to the complete discharge of said capacitor for terminating the exposure of said negative to said one of said primary colors.

10. Combination set forth in claim 7 wherein said means responsive to each of said analog voltages include a capacitor to be charged to said analog voltage, a phototube responsive to one of said primary additive colors, means connecting said capacitor to said phototube for discharging said capacitor through said phototube as light from said light source impinges thereon, and means responsive to the complete discharge of said capacitor for terminating the exposure of said negative to said one of said primary colors.

11. The combination set forth in claim 6 wherein said means responsive to the amplitude of each of said analog voltages comprises: three gain controlled amplifiers each connected to receive the analog voltage corresponding to a different one of said primary additive colors; means connected to said amplifiers for summing the outputs thereof; a reference voltage source; a differential amplifier connected to receive said summed outputs and connected to receive said reference voltage to provide an error voltage to be fed back to said gain controlled amplifiers; output amplifying means connected to the output of the gain controlled amplifiers corresponding to the primary additive colors of red and green; a cathode ray tube; means connecting said output amplifying means to the horizontal and vertical controls of said cathode ray tube; and a mask secured to the face of said cathode ray tube divided into zones corresponding to color corrections required for the negative being examined, whereby the cathode ray tube beam will illuminate a zone indicating the proper color correction to be used in printing the negative.

12. The combination set forth in claim 8 wherein said means responsive to the amplitude of each of said analog voltages comprises: three gain controlled amplifiers each connected to receive the analog voltage corresponding to a different one of said primary additive colors; means connected to said amplifiers for summing the outputs thereof; a reference voltage source; a differential amplifier connected to receive said summed outputs and connected to receive said reference voltage to provide an error voltage to be fed back to said gain controlled amplifiers; output amplifying means connected to the output of the gain controlled amplifiers corresponding to the primary additive colors of red and green; a cathode ray tube; means connecting said output amplifying means to the horizontal and vertical controls of said cathode ray tube; and a mask secured to the face of said cathode ray tube divided into zones corresponding to color corrections required for the negative being examined, whereby the cathode ray tube beam will illuminate a zone indicating the proper color correction to be used in printing the negative.

13. Combination set forth in claim 5 including a raster plate having a plurality of openings therein positioned adjacent said negative, said openings receiving light from said light source passing through said negative and defining said predetermined discrete areas; a plurality of light transmitting optical fibers each having one end thereof secured in one of said openings in said raster plate; and a second plate having a plurality of openings therein, the opposite end of each of said optical fibers imbedded in said openings of said second plate; a rotating disc mounted adjacent said second plate and having an opening extending therethrough to sequentially expose the openings in said second plate and the ends of the optic fibers secured thereto; a light tight enclosure enclosing said second plate and rotating disc; said plurality of photodetecting means mounted in said enclosure to receive light from said light source directed through said negative, optic fibers. and opening in said rotating disc.

14. Combinations set forth in claim 6 including a raster plate having a plurality of openings therein positioned adjacent said negative, said openings receiving light from said light source passing through said negative and defining said predetermined discrete areas; a plurality of light transmitting optical fibers each having one end thereof secured in one of said openings in said raster plate; and a second plate having a plurality of openings therein, the opposite end of each of said optical fibers imbedded in said openings of said second plate; a rotating disc mounted adjacent said second plate and having an opening extending therethrough to sequentially expose the openings in said second plate and the ends of the optic fibers secured thereto; a light tight enclosure enclosing said second plate and rotating disc; said plurality of photodetecting means mounted in said enclosure to receive light from said light source directed through said negative, optic fibers, and opening in said rotating disc.

15. Combination set forth in claim 7 including a raster plate having a plurality of openings therein positioned adjacent said negative, said openings receiving light from said light source passing through said negative and defining said predetermined discrete areas; a plurality of light transmitting optical fibers each having one end thereof secured in one of said openings in said raster plate; and a second plate having a plurality of openings therein, the opposite end of each of said optical fibers imbedded in said openings of said second plate; a rotating disc mounted adjacent said second plate and having an opening extending therethrough to sequentially expose the openings in said second plate and the ends of the optic fibers secured thereto; a light tight enclosure enclosing said second plate and rotating disc; said plurality of photodetecting means mounted in said enclosure to receive light from said light source directed through said negative, optic fibers, and opening in said rotating disc.

16. Combination set forth in claim 8 including a raster plate having a plurality of openings therein positioned adjacent said negative, said openings receiving light from said light source passing through said negative and defining said predetermined discrete areas; a plurality of light transmitting optical fibers each having one end thereof secured in one of said openings in said raster plate; and a second plate having a plurality of openings therein, the opposite end of each of said optical fibers imbedded in said openings of said second plate; a rotating disc mounted adjacent said second plate and having an opening extending therethrough to sequentially expose the openings in said second plate and the ends of the optic fibers secured thereto; a light tight enclosure enclosing said second plate and rotating disc; said plurality of photodetecting means mounted in said enclosure to receive light from said light source directed through said negative, optic fibers, and opening in said rotating disc.

17. Combination set forth in claim 13 wherein one end of each of said optic fibers is imbedded in said raster plate and wherein the opposite ends of each of said optic fibers is imbedded in said second plate in a randomly distributed fashion.

18. Combination set forth in claim 14 wherein one end of each of said optic fibers is imbedded in said raster plate and wherein the opposite ends of each of said optic fibers is imbedded in said second plate in a randomly distributed fashion.

19. Combination set forth in claim 15 wherein one end of each of said optic fibers is imbedded in said raster plate and wherein the opposite ends of each of said optic fibers is imbedded in said second plate in a randomly distributed fashion.

20. Combination set forth in claim 16 including a raster plate having a plurality of openings therein positioned adjacent said negative, said openings receiving light from said light source passing through said negative and defining said predetermined discrete areas; a plurality of light transmitting optical fibers each having one end thereof secured in one of said openings in said raster plate; and a second plate having a plurality of openings therein, the opposite end of each of said optical fibers imbedded in said openings of said second plate; a rotating disc mounted adjacent said second plate and having an opening extending therethrough to sequentially expose the openings in said second plate and the ends of the optic fibers secured thereto; a light tight enclosure enclosing said second plate and rotating disc; said plurality of photodetecting means mounted in said enclosure to receive light from said light source directed through said negative, optic fibers, and opening in said rotating disc.

21. The method of forming a color print from a color negative by controlling the time intensity integral of the exposure comprising the steps of:

a. scanning said negative by transmitting light through it and detecting said light separately for a plurality of individual illuminated areas of said negative;

b. generating an electric signal for each of the primary additive colors, linearly proportional to the fraction of the total area of the negative having a transmissivity greater than the mean transmissivity of the area; and c. setting the time intensity integral of the exposure in each of said colors proportional to the electric signal generated for that color.

22. In combination, a light source; means directing light from said light source through a negative through a plurality of predetermined discrete areas in said negative; a plurality of photodetecting means, each responsive to a different additive primary color, and each positioned to receive the light transmitted through said negative for generating electric signals linearly proportional to the intensity of light incident thereupon; a plurality of electric circuit means, each connected to a different one of said photodetecting means, and each responsive to the electric signals generated by a photodetecting means connected thereto for generating an analog voltage proportional to the fraction of the total number of said discrete areas having light transmission higher than the mean light transmission of all of said areas.

23. Apparatus for generating an analog voltage in response to light transmitted through a negative comprising:

a. a light source;

b. means for scanning said negative at a plurality of discrete areas;

c. a plurality of photodetecting means each responsive to a different additive primary color and each positioned to receive the light transmitted through said discrete areas for generating electric signals linearly proportional to the intensity of the light in an additive primary color incident thereupon;

d. a plurality of circuit means each connected to a different one of said photodetectors for receiving one of said electric signals, each of said circuit means including:

1. dividing means for receiving and dividing said electric signal into first and second signals;
2. integrating means connected to said dividing means for receiving and integrating said first signal;
3. a voltage comparator connected to said dividing means and to said integrating means for receiving said second signal and the integrated first signal and for generating a train square wave pulses of predetermined amplitude having a duty cycle proportional to the time that said second signal is higher than said integrated first signal; and
4. second integrating means connected to said comparator for receiving and integrating said train of square wave pulses to form an analog voltage linearly proportional to the fraction of the total area of said negative having light transmissivity higher than the mean transmissivity of said total area.

* * * * *